United States Patent [19]

Muller

[11] 3,948,368
[45] Apr. 6, 1976

[54] SLOTTED AND RESILIENT CORRECTING RING PREFERABLY FOR SYNCHRONIZING DEVICES IN CHANGE-SPEED GEARS OF MOTOR VEHICLES

[75] Inventor: Robert Muller, Weissach, Germany

[73] Assignee: Dr. Ing. H.c.F. Porsche Aktiengesellschaft, Germany

[22] Filed: Feb. 25, 1975

[21] Appl. No.: 553,149

[30] Foreign Application Priority Data
Mar. 28, 1974 Germany............................ 2414949

[52] U.S. Cl. .......................... 192/53 C; 192/107 R
[51] Int. Cl. ............................................. F16d 13/00
[58] Field of Search .......... 192/107 R, 107 C, 53 C, 192/53 B, 53 E

[56] References Cited
UNITED STATES PATENTS

| | | | |
|---|---|---|---|
| 3,152,676 | 10/1964 | Mandlinger et al. | 192/107 R |
| 3,200,920 | 8/1965 | Reich | 192/53 C |
| 3,504,775 | 4/1970 | Reich et al. | 192/107 R X |
| 3,688,883 | 9/1972 | Austen | 192/53 C |
| 3,744,604 | 7/1973 | Austen | 192/53 C |

Primary Examiner—Samuel Scott
Assistant Examiner—Lance W. Chandler
Attorney, Agent, or Firm—Craig & Antonelli

[57] ABSTRACT

Synchronizing apparatus for change-speed gears including a slotted resilient correcting ring interposed between two change-speed gear members for attenuating the transfer of rotating shifting forces therebetween. The free ends of the correcting ring are offset from one another a predetermined distance in a direction parallel to the central longitudinal axis of the correcting ring so as to provide an axial pretensioning force against the freely rotatable gear to prevent rattling thereof. In a particularly preferred embodiment the axial offset of the free ends of the correcting ring is greater in the unstressed condition than in the assembled in-use position. In another preferred embodiment, the unstressed axial offset of the free ends of the correcting ring is substantially the same as the distance between the members abutting against the correcting ring in the in-use position.

7 Claims, 2 Drawing Figures

SLOTTED AND RESILIENT CORRECTING RING PREFERABLY FOR SYNCHRONIZING DEVICES IN CHANGE-SPEED GEARS OF MOTOR VEHICLES

BACKGROUND AND SUMMARY OF THE INVENTION

The invention relates to a slotted and resilient correcting ring, preferably for synchronizing devices in change-speed gears of motor vehicles. These types of synchronizing devices are provided with an axially movable gearshift sleeve arranged on a gearshift sleeve carrier which sleeve is brought into engagement with a clutch body of a gear to be shifted. The correcting ring is supportably arranged with a radially effective pretension in the clutch body.

Correcting rings for change-speed gears for motor vehicles of this type are known which are arranged in the clutch body of the gear to be shifted under radially-directed effective pretension. These correcting rings are secured in an axial direction at one side thereof by a face of the clutch body and at the other side by means of locking rings, however without the correcting ring, respectively its ring ends, as a result of their construction, being in contact with the face of the clutch body and the locking ring. For the reduction of the axial clearance at loose gears of change-speed gears to be shifted, spring rings are arranged on the gear shaft through which the loose gears in the not shifted position are axially secured without clearance. By these additional uses of spring rings, the effort for assembly as well as the production cost of the gear is increased.

The task of the invention resides therein to construct the correcting rings themselves in such a way that the loose-gears in the not shifted position (condition) are axially secured without clearance without the requirement of additional elements.

According to the invention, the ring ends of the correcting ring are provided with a predetermined impact displacement in the axial direction A—A (see the drawings). In especially advantageous preferred embodiment of the invention the impact displacement is defined in this manner such that the correcting ring in the assembled condition is provided in the axial direction A—A with a pretension (initial tension). By this means, the correcting ring in the assembled condition can support itself in the axial direction A—A with one ring end thereof on a face of the clutch body and with the other ring end on a face of the gearshift carrier under axial pretension (initial tension). A primary advantage of the present invention is the elimination of the need for the previously required spring rings to maintain the axial clearance free position of the loose-gears when in a not shifted condition. A further advantage is that the manufacturing process of such correcting ring is considerably simplified since special process steps were necessary in prior arrangements in order to avoid an impact displacement. On the other hand, it is simpler to establish the impact displacement for a pre-defined measure in the construction of the ring of the present invention.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE DRAWINGS

Figure 1:
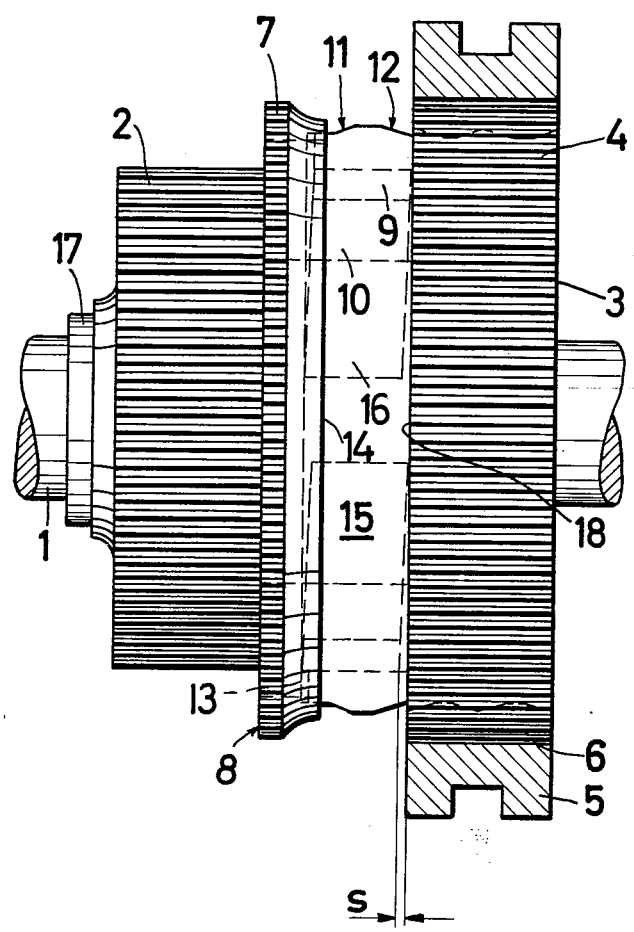
FIG. 1 is a partial longitudinal sectional view through the essential parts of a synchronizing device for the gearshift sleeve gearing of a motor vehicle having axially pretensioned correcting rings constructed in accordance with the present invention.
Figure 2:
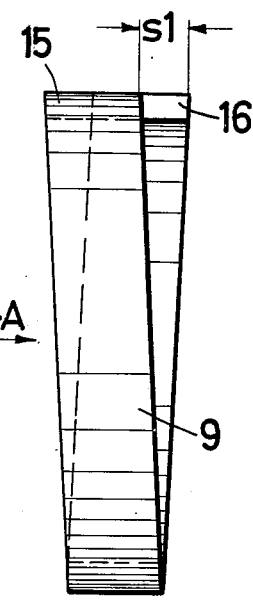
FIG. 2 shows a correcting ring constructed in accordance with the present invention in the unassembled unstressed condition.

In the portion shown in FIG. 1 of a change-speed gear device, a gear 2 is rotatably arranged on a gear shaft 1. Gear 2 is longitudinally fixed in position on shaft 1 and is in constant engagement with a gear arranged on a separate gear shaft, not shown. A gearshift sleeve carrier 3 is rotatably and longitudinally fixed in position on the gear shaft 1. Toothing 4 is provided at the outer circumference of carrier 3. A gearshift sleeve 5 is arranged, axially movable, on gearshift sleeve carrier 3. Sleeve 5 is provided with toothing 6 on its radially inwardly facing surface which toothing 6 corresponds to toothing 4. Gear 2 is solidly connected with a clutch body 8 provided with toothing 7 corresponding to these toothings 6 which toothing 7 is connectable (selectively interengageable upon movement of sleeve 5) with the gearshift sleeve 5. The head surfaces of the teeth of the toothing 6 of gearshift sleeve 5 work together with a correcting ring 9 which is arranged on the hub 10 of the clutch body 8 of the gear 2 to be shifted. Correcting ring 9 is provided with a centering surface 11 and a friction surface 12 as illustrated in FIG. 1. The centering surface 11 is constructed shoulder-like and the correcting ring together with it are arranged in a recess 13 of the face 14 of the clutch body 8 under radial tension. The impact ends 15 and 16 of correcting ring 9 are provided in the assembled condition and axial direction A—A with an impact displacement s and in the not assembled (unstressed) condition the correcting ring 9 is provided with a larger impact displacement $s1$ than impact displacement $s$. The gear 2 is secured in an axial direction on the side facing away from the clutch body, for example, by means of a guard plate 17.

During assembly of the shown gearing apparatus, the impact displacement $s1$ of the ring ends 15 and 16 is reduced to the dimension $s$ whereby the ring end 15 rests against the face 18 of the gearshift sleeve carrier 3 and the ring end 16 rests against the face 14 of the clutch body respectively the recess 13 of the clutch body under tension. Through the initial tension, the gear 2 is pressed with a small force and in the not shifted condition, against the guard plate 17 whereby a so-called "gear rattle" through this gear is surely avoided.

A further non-illustrated embodiment of the invention is constructed with the impact displacement s equal to $s1$ so that in the assembled condition no pretension is obtained. In this last-mentioned construction, the laying of the ring end 15 against the face 18 of the gearshift sleeve carrier 3 and ring end 16 against the face 14 of the clutch body, respectively the recess 13 of the clutch body, a gearing rattle is extensively avoided.

While I have shown and described one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Synchronizing apparatus for change-speed gears including a slotted resilient correcting ring for attenuating the transfer of rotative shifting forces between two change-speed gear members, wherein the free ends of said correcting ring are offset from one another a predetermined distance in a direction parallel to the central longitudinal axis of said correcting ring.

2. Apparatus according to claim 1, wherein said predetermined distance is greater than the distance between said two gear members, whereby the correcting ring can apply continuous pretensioning forces in the axial direction between said two gear members.

3. Apparatus according to claim 1, further comprising a first gear member having a clutch body, a second gear member, and a gearshift sleeve axially movable carried by said second gear member for movement between a first position out of engagement with said clutch body and a second position in engagement with said clutch body, wherein the correcting ring is supportably arranged in said clutch body under radial pretensioning in such a position that said sleeve frictionally engages said correcting ring during movement of said sleeve from said first position toward said second position.

4. Apparatus according to claim 3, wherein said predetermined distance in the unstressed condition of the correcting ring is greater than the in-use axial displacement of the free ends thereof with one axial end face of the correcting ring engaging said clutch body of the first gear member and the other axial end face thereof engaging said seocnd gear member, whereby the correcting ring continuously applies an axial pretensioning force between said first and second gear members.

5. Apparatus according to claim 3, wherein said predetermined distance in the unstressed condition of the correcting ring is greater than the in-use axial displacement of the free ends thereof, whereby the correcting ring continuously applies an axial pretensioning force between said first and second gear members.

6. Apparatus according to claim 1, wherein said ring is constructed substantially symmetrically with respect to a diametric plane passing intermediate the free ends thereof.

7. Apparatus according to claim 4, wherein said ring is constructed substantially symmetrically with respect to a diametric plane passing intermediate the free ends thereof.

* * * * *